UNITED STATES PATENT OFFICE.

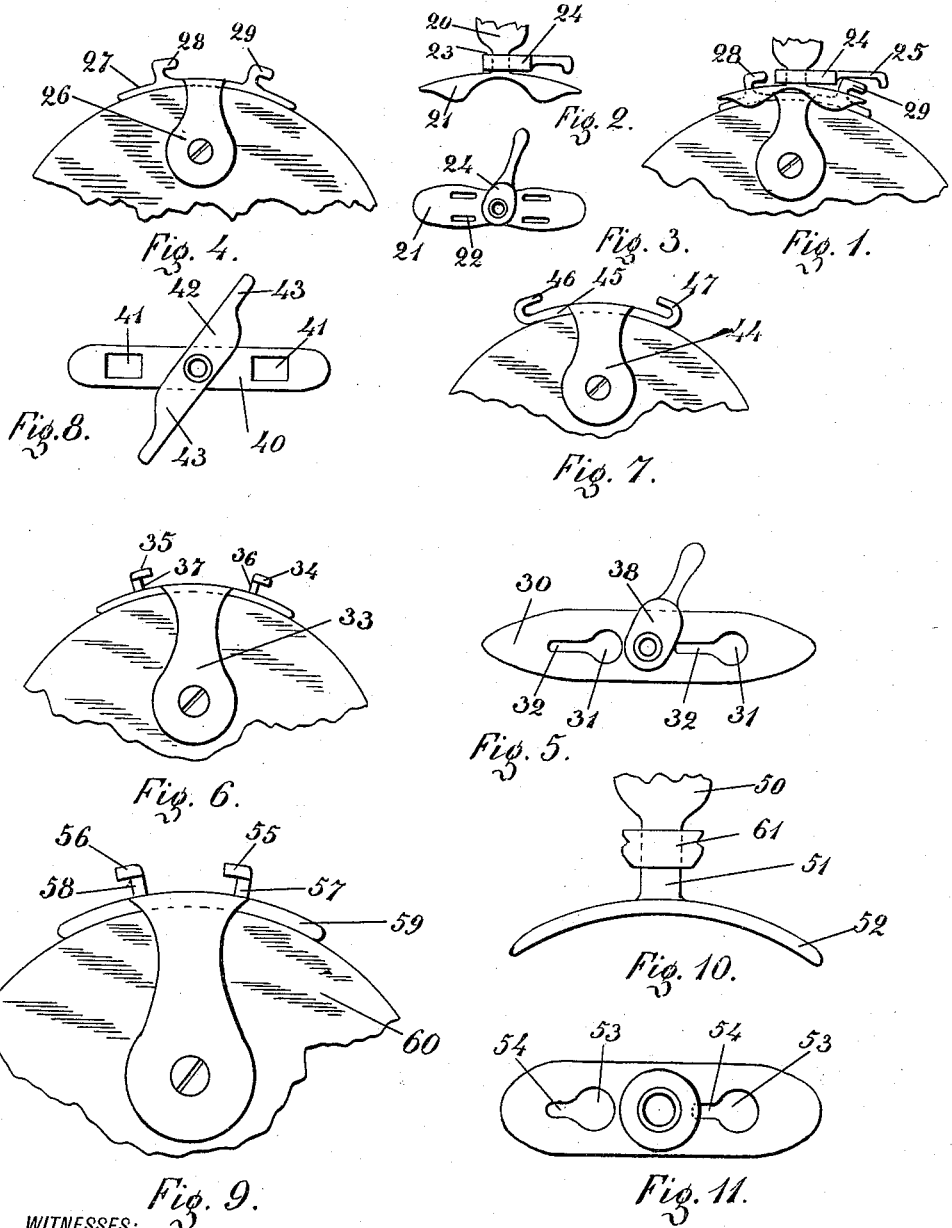

GOTHARD LOWENSTEIN, OF NEW YORK, N. Y.

LENS-SECURING DEVICE.

1,148,105.   Specification of Letters Patent.   Patented July 27, 1915.

Application filed September 15, 1913. Serial No. 789,890.

*To all whom it may concern:*

Be it known that I, GOTHARD LOWENSTEIN, a citizen of the United States, residing in the borough of Brooklyn, in the city of New York, county of Kings, and State of New York, have invented certain new and useful Improvements in Lens-Securing Devices, of which the following is a full, clear, and exact description, reference being had to the accompanying drawings, forming a part of this specification.

This invention relates to devices for removably connecting lenses to eye glass or spectacle frames, and its object is to provide novel and improved arrangements whereby a lens can be readily attached to an eye glass or spectacle frame and can also be readily detached from the same without the necessity of using any tools.

Devices for temporarily connecting lenses to eye glass or spectacle frames in such a manner that a broken lens can be easily and instantly replaced, are not new, and some arrangements relating to such devices have been described and claimed by me in three patent applications for "detachable lens mounting," "means for securing lens mounting devices," and "lens mounting devices," simultaneously filed herewith; the one forming the object of the present invention however, differs from the ones shown in said applications, inasmuch as the lens head mounted on the lens is attached to the stud endwise; the resulting arrangements being simpler and easier to manufacture, and being also more readily set in place.

Referring to the drawings, Figure 1 is a plan view of a locking arrangement, in which a cam member is used to exert the locking action, securing the lens to the stud; Fig. 2 is a detail plan view of the stud and locking member used in said arrangement; Fig. 3 is a front view in elevation of the same; Fig. 4 is a plan view of the lens head used in connection with said arrangement; Fig. 5 is a front view in elevation of a stud and locking member slightly different from the one illustrated in Fig. 3; Fig. 6 is a plan view of a lens head which may be used in connection with the same; Fig. 7 is a plan view of a different style of lens head; Fig. 8 is a front view of a stud with locking member adapted to be used in connection with the same; Fig. 9 is a plan view of a lens head similar to the one illustrated in Fig. 6; Fig. 10 is a fragmentary plan view of a different style of stud and locking member adapted to be used in connection with the same; and Fig. 11 is a front view in elevation of the same.

Referring to Figs. 1 to 4, 20 designates a stud provided with a holding plate 21, which has longitudinal slots 22; around the neck 23 of said stud is rotatably mounted a cam member 24, having an operating handle 25. 26 designates a lens head secured to the lens in any suitable manner, said lens head comprising a lens head plate 27, provided with hook shaped projections 28, 29, adapted to be inserted through slots 22 of plate 21. Referring to Fig. 1, it is seen that when said projections 28, 29 are inserted through slots 22, after cam member 24 is rotated so as to cause its cam portion to act against the rear of projection 29, the lens head will be moved in a tangential direction in relation to plate 21, and the hook portion of projections 28, 29, will be caused to overlap plate 21 and therefore to be firmly retained thereby.

In Figs. 5 and 6, I illustrate a similar arrangement in which the stud plate 30 is provided with only two slots each having an enlarged portion 31 and a narrow portion 32; a lens head 33 is provided with two lugs 34, 35, which have a stem 36, 37 narrower than the head. By inserting the head of lugs 34, 35 through enlarged portions of the slots 31, and by moving around cam member 38 so as to act against the rear of projection 35, the lens will be moved tangentially by plate 30, so as to cause the narrow parts 36, 37 of lugs 34, 35 to enter through narrow part 32 of the slots; the lens will therefore be securely held in place.

In Figs. 7 and 8, I illustrate a different arrangement in which 40 designates a stud plate having two openings 41, provided with a pivoted locking member 42, having two end fingers 43; 44 is a lens head having a plate 45, the two ends of which are bent outward to form hooked portions 46, 47 adapted to enter through openings 41. It is obvious that if said hooked portions are inserted through openings 41 and then pivoted member 42 is moved around, fingers 43 will engage hooked portions 46, 47, and will retain the lens in position. To disengage the lens it will be sufficient to rotate locking member 42 in the opposite direction, so as to clear hooked portions 46, 47, when the lens can be freely detached from the stud.

A further arrangement is illustrated in

Figs. 9 to 11, which may be applied in those studs having the neck sufficiently long, the length of the neck being dependent on the pupillary distance of the eyes of the wearer. In said arrangement, 50 designates a stud having a neck 51 and a stud plate 52, provided with two slots, each having a wide portion 53 and a narrow portion 54. Said slots are adapted to receive two projections 55, 56, each having a narrow stem 57, 58, integral with plate 59 of lens head 60.

The parts so far described are closely similar to those entering into the arrangement shown in Figs. 5 and 6, with the difference that in the present arrangement a cam acting member in the form of a ring 61 is slidably mounted on neck 51, so that when the lens head projections have been inserted through the wide part of the slots 53, and said ring 61 is moved outwardly, the same presses against the rear of projection 56, and will cause stems 57, 58, to enter through the inner part 54 of the slots; the lens will thus be secured in position in a manner somewhat similar to that shown in Figs. 5 and 6.

The arrangements described permit of using lens heads and lens holding studs which are quite similar to those applied in the usual construction of eye glasses or spectacles, and are moreover possessed of the advantage of being exceedingly simple to manufacture and to operate. It is obvious that the same can be modified to a certain extent without departing from the substance of my invention and from the scope of the appended claims.

I claim:

1. In a device of the class described, the combination of a lens, a lens holding stud provided with a plate, against which the edge of said lens rests, a lens head mounted on said lens, and means for detachably connecting said lens head to said plate.

2. In a device of the class described, the combination of a lens, a lens holding stud provided with a plate against which the edge of said lens rests, a lens head mounted on said lens having parts adapted to interlock with said plate, and means for securing said lens head to said plate.

3. In a device of the class described, the combination of a lens, a lens holding stud provided with a slotted plate against which the edge of said lens rests, a lens head mounted on said lens having projections adapted to interlock with the slots of said plate, and means mounted on said stud for securing said lens head to said plate.

4. In a device of the class described, the combination of a lens, a lens holding stud provided with a slotted plate against which the edge of said lens rests, a lens head mounted on said lens having outward projections adapted to interlock with the slots of said plate, and a cam member mounted on said stud securing said lens head to said plate.

5. In a device of the class described, the combination of a lens, a lens holding stud provided with a slotted plate against which the edge of said lens rests, a lens head mounted on said lens having outward projections adapted to interlock with the slots of said plate, and a cam member rotatably mounted on said stud securing said lens to said plate.

GOTHARD LOWENSTEIN.

Witnesses:
A. ABELOFF,
J. OBERG.

Copies of this patent may be obtained for five cents each, by addressing the "Commissioner of Patents, Washington, D. C."